United States Patent
Ziegler et al.

(10) Patent No.: US 7,142,726 B2
(45) Date of Patent: Nov. 28, 2006

(54) THREE-DIMENSIONAL SCENE RECONSTRUCTION FROM LABELED TWO-DIMENSIONAL IMAGES

(75) Inventors: Remo Ziegler, Cambridge, MA (US); Wojciech Matusik, Arlington, MA (US); Hanspeter Pfister, Arlington, MA (US)

(73) Assignee: Mitsubishi Electric Research Labs, Inc., Cambridge, MA (US)

( * ) Notice: Subject to any disclaimer, the term of this patent is extended or adjusted under 35 U.S.C. 154(b) by 807 days.

(21) Appl. No.: 10/391,998

(22) Filed: Mar. 19, 2003

(65) Prior Publication Data

US 2004/0184655 A1    Sep. 23, 2004

(51) Int. Cl.
G06K 9/00 (2006.01)
G06K 9/36 (2006.01)
G06T 17/00 (2006.01)

(52) U.S. Cl. .......................... 382/285; 382/154; 345/420
(58) Field of Classification Search ................. 382/154, 382/180, 285; 345/419–427
See application file for complete search history.

(56) References Cited

U.S. PATENT DOCUMENTS

| | | |
|---|---|---|
| 6,930,683 B1 * | 8/2005 | Slabaugh et al. ............ 345/420 |
| 6,990,228 B1 * | 1/2006 | Wiles et al. ................. 382/154 |
| 7,079,680 B1 * | 7/2006 | Baumberg ................... 382/154 |

OTHER PUBLICATIONS (See IDS): Kutulakos et al., "A Theory of Shape by Space Carving," University of Rochester CS Technical Report #692.*
Kutulakos et al., "*A Theory of Shape by Space Carving*," University of Rochester CS Technical Report #692, May 1998.

* cited by examiner

*Primary Examiner*—Jingge Wu
*Assistant Examiner*—Yubin Hung
(74) *Attorney, Agent, or Firm*—Dirk Brinkman; Clitton D. Mueller; Gene V. Vinokur (57) ABSTRACT

A method constructs three-dimensional (3D) models of a scene from a set of two-dimensional (2D) input images. The 3D model can then be used to reconstruct the scene from arbitrary viewpoints. A user segments and labels a set of corresponding polygonal regions in each image using conventional photo-editing tools. The invention constructs the model so that the model has a maximum volume that is consistent with the set of labeled regions in the input images. The method according to the invention directly constructs the polygonal model.

20 Claims, 7 Drawing Sheets

Cell Carving Method

Acquire set of input images
Initialize a bounding volume V containing the entire scene.

Cell Carve ( input images, initial volume )
   while VolumeConsistent = FALSE do
      Project region IDs onto the current volume.
      Detect a point P on the volume surface that has inconsistent labeling in at least four cameras.
      if there are ID inconsistencies then
         Project inconsistent point P into all input images.
         Points falls into a region with some ID in each image.
         Compute a cell C corresponding to these regions.
         Remove cell C from the current volume.
      else
         VolumeConsistent = TRUE
      end if
   end while

```
 1: Create volume V containing the entire scene
 2: Create a set I of label images
 3: CellCarve ( I, V )
 4: Compute the boundary cells $V_c$ that approximate V
 5: Remove all cells with background IDs
 6: repeat
 7:     AllCellsConsistent = TRUE
 8:     for Every cell c in $V_c$ do
 9:         for Every triangle t in c do
10:             for Every input image i in I do
11:                 Project t onto image i with visibility
12:                 Record region ID of its projection
13:             end for
14:             k = Number of inconsistent images for t
15:             if k >= 4 then
16:                 AllCellsConsistent = FALSE
17:                 Remove the inconsistent cell c
18:                 Construct the neighbors of c
19:             end if
20:         end for
21:     end for
22: until AllCellsConsistent = TRUE
```

THREE-DIMENSIONAL SCENE RECONSTRUCTION FROM LABELED TWO-DIMENSIONAL IMAGES

FIELD OF THE INVENTION

This invention relates generally to image-based modeling, and more particularly to reconstructing a three-dimensional scene from two-dimensional images.

BACKGROUND OF THE INVENTION

Constructing a photorealistic three-dimensional (3D) model from multiple two-dimensional (2D) images of a scene is a fundamental problem in computer vision and image-based modeling. The 3D model can then be used to reconstruct the scene from arbitrary viewpoints.

The emphasis for most prior art computer vision methods has been on automatic reconstruction of the scene with little or no user intervention. Consequently, computer vision methods make a priori assumptions about the geometry and reflectance in the scene. These assumptions are often incorrect.

In contrast, many image-based modeling systems require that a user directs the construction of the 3D model that is used as the scene representation. However, the specification of those 3D models can be difficult, and tools used to construct the models are often inflexible, i.e., they only deal with a very simple set of shapes, and thus, cannot be used for complex scenes.

A fundamental problem in 3D scene reconstruction is assigning correspondences between points in two or more images that are projections of the same point in the scene. Previous work uses pixels or object silhouettes to specify the point correspondences.

The problem of 3D model construction from images has received a tremendous amount of attention in the computer vision literature, see Kutulakos et al., "A theory of shape by space carving," Intl. Journal of Computer Vision Vol. 38:3, pp. 199–218, 2000 for an overview.

Multi-View Stereo Reconstruction

Multi-view stereo methods construct 3D models by automatically determining pixel correspondences in multiple images. Stereo correspondence methods work well when the distance between different viewpoints, often called the baseline, is small.

This is especially true for a sequence of frames or video, where tracking matches correspondences between frames. To deal with large changes in viewpoints, some methods extract a partial 3D shape from a subset of images using multi-baseline stereo techniques.

However, to construct a single 3D model requires complex reconstruction and merge methods, and there is no guaranty on global consistency between the entire set of images and the merged model. Accurate point correspondences are difficult to determine in regions with homogeneous color and intensity.

View-dependent effects, such as specular highlights or reflections, lead to correspondence mismatches. Obtaining dense correspondence for many image points is especially hard. Differences between images due to occlusions are also difficult to handle. This is a severe problem for general 3D scene reconstruction where such occlusions happen frequently.

Shape-From-Silhouettes Reconstruction

Shape-from-silhouette methods construct the 3D model as an intersection of visual rays from the center of projection of the camera through all points in object silhouettes.

Shape-from-silhouette methods construct a shape known as a visual hull. However, those methods can never recover concavities. The visual hull can be improved by adding depth from multi-view stereo images, subject to some of the drawbacks mentioned above. Shape-from-silhouette methods fail for scenes with major occlusions, and they only work for outside-looking-in camera arrangements. That is, the scene must lie inside the convex hull of the cameras.

Therefore, it is desired to construct a 3D model with concavities, and to handles arbitrary scene occlusions and camera placements.

Photometric Reconstruction

Photometric constraints can be used to construct a 3D model that is demonstrably better than the visual hull. Voxel coloring can be used to gradually carve out voxels from a 3D volume that are not color-consistent with any image pixels to which the voxels project.

Voxel coloring has also been used with arbitrary camera placements, graphics hardware acceleration, and multiple color hypothesis for each voxel. However, voxel coloring does not work well for large scenes or objects with big differences in scale. Constructing a 3D model for interactive viewing requires a lengthy process that may introduce inconsistencies in the representation of the shape.

Fundamentally, all photometric approaches rely on a locally computable analytic model of reflectance. This assumption fails for global illumination effects such as shadows, transparency, or inter-reflections.

Because simultaneous recovery of surface shape, reflectance, and illumination is difficult, prior art photometric construction methods assume that surfaces are diffuse reflective or Lambertian, or nearly so. Therefore, photometric methods do not work for objects with a homogeneous surface color.

Therefore, it is desired to provide a user-assisted model construction method that overcomes the limitations of the prior art, and that can construct models of scenes containing highly specular, transparent, and uniformly colored objects.

Image-Based Reconstruction

Image-based modeling methods typically split the task of 3D model construction between the user and the computer. Some methods construct a model from a single image using user-defined billboards or user tools to paint depth images, edit the model, and change the illumination in images.

Despite the utility and versatility of those methods, specifying depth images for multiple images requires a substantial, if not an impractical amount of user input. More important, there is no guaranty that the resulting 3D model is globally consistent with all the input images.

It is a considerable advantage to use geometric constraints when the scene is known to have a certain structure. Some methods depend on user-guided placement of polyhedral primitives to reconstruct architectural scenes. Other methods exploit geometric characteristics of scenes with planes and parallel lines. However, those methods are generally not applicable for constructing 3D models of arbitrary scenes. In addition, those methods rely on lengthy optimization procedures.

Therefore, it is desired to use image-based modeling where a user assigns region correspondences so that a globally consistent model can be constructed without making any assumptions about the geometry or reflectance in the scene.

SUMMARY OF THE INVENTION

The invention provides a method for constructing three-dimensional (3D) models of a scene from a set of two-dimensional (2D) input images. The 3D model can then be used to reconstruct the scene from arbitrary viewpoints.

A user segments and labels a set of corresponding polygonal regions in each image using conventional 2D photo-editing tools. The invention constructs the 3D model so that the model has a maximum volume that is consistent with the set of labeled regions in the input images. The method according to the invention directly constructs the 3D polygonal model.

DETAILED DESCRIPTION OF THE PREFERRED EMBODIMENT

Figure 7:
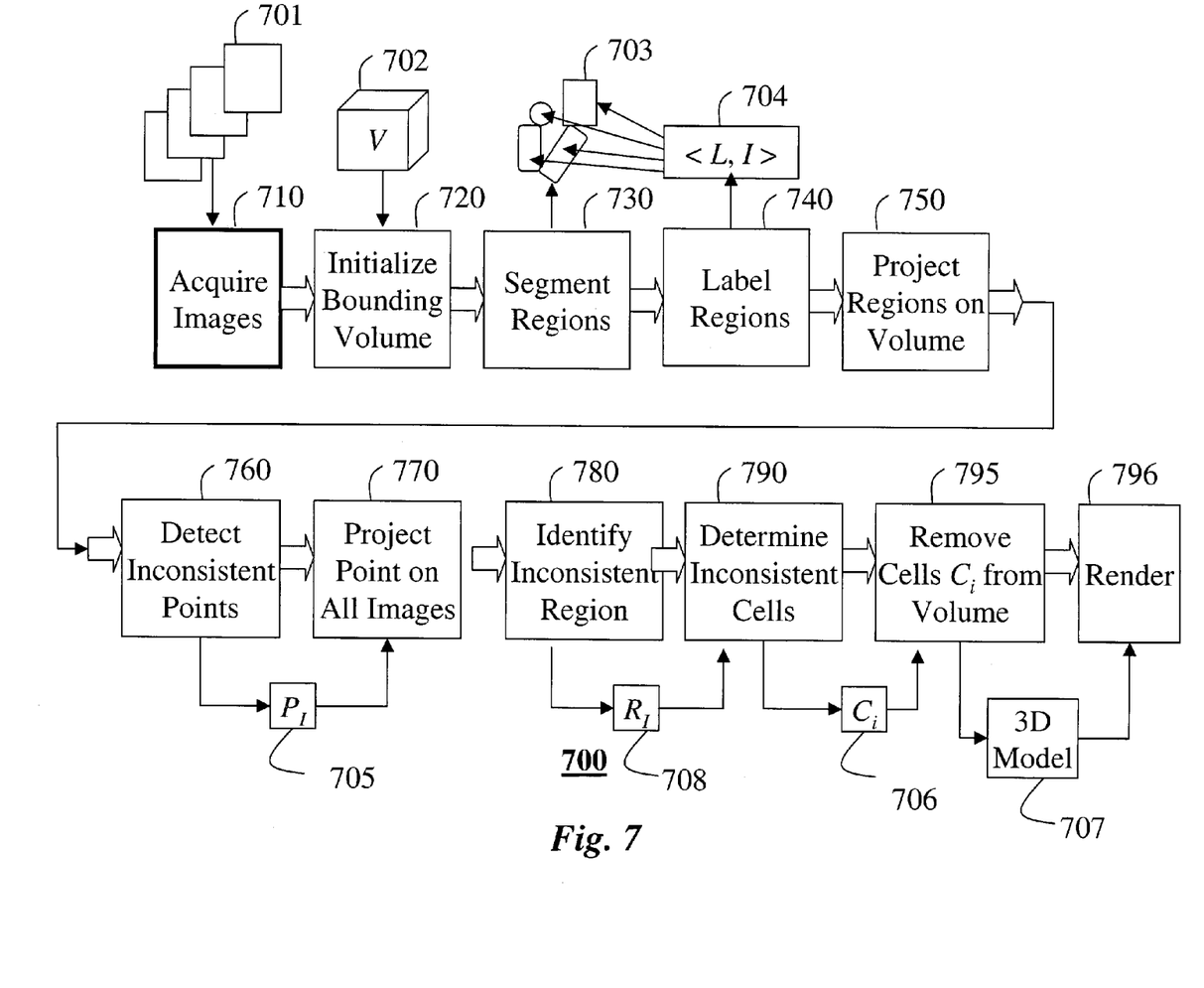
FIG. 7 is a flow diagram of a method for constructing a 3D model from 2D images of a scene.

FIG. 7 shows a method 700 for constructing a three-dimensional (3D) model 707 of a scene from a set of calibrated two-dimensional (2D) images 701 taken from arbitrary viewpoints.

First, the images 701 are acquired 710 of a scene. A bounding volume V 702 is initialized 720. This can be done manually or automatically. The bounding volume encloses the entire scene.

The images are segmented 730 into regions 703. For example, images of a person can be segmented into a head, a torso, and limbs, or a still live scene can be segmented into table, cups, plates, and flower vase. Conventional user-operated or automatic segmentation tools can identify the regions. In the preferred embodiment, the segmentation is along depth discontinuities in the scene.

The regions 730 are labeled 740 with unique labels <L, I> 704 or identifications (ID). The labeled regions are projected 750 onto the volume 702 to detect 760 inconsistent points $P_i$ 705. The inconsistent points $P_i$ are then projected 770 onto all of the images to identify 780 inconsistent regions $R_i$ 708, and determine 790 inconsistent cells $C_i$ 706 in the inconsistent regions.

The inconsistent cells $C_i$ 706 are removed 795 from the volume, until a maximum volume consistent with the scene remains as a 3D model of the scene. The model 707 can then be displayed on an output device using conventional rendering 796 hardware or software, for arbitrary viewpoints.

Our method automatically generates the 3D geometric model 707 that is consistent with the segmentation. The solution is unique, in that is it the maximum volume that reproduces the segmentation. The method directly computes one or more 'watertight' polygon meshes of the scene.

Our method is the first to use correspondence between arbitrary image regions. We provide a novel problem formulation for general scene reconstruction from image regions.

We also define necessary conditions for removing labeled regions with inconsistencies in multiple views.

Our method uses a novel cell carving procedure, which yields a unique solution to the problem. We also describe an efficient implementation of cell carving that uses graphics hardware and standard 2D polygon intersections.

Our user-assisted method can reconstruct scenes that are very difficult or impossible to reconstruct with traditional methods, e.g., scenes with substantial occlusion among multiple objects, large variations in geometric scale and detail, and a mix of textured, uniformly colored, specular, and transparent surfaces.

Analysis

Figure 1:
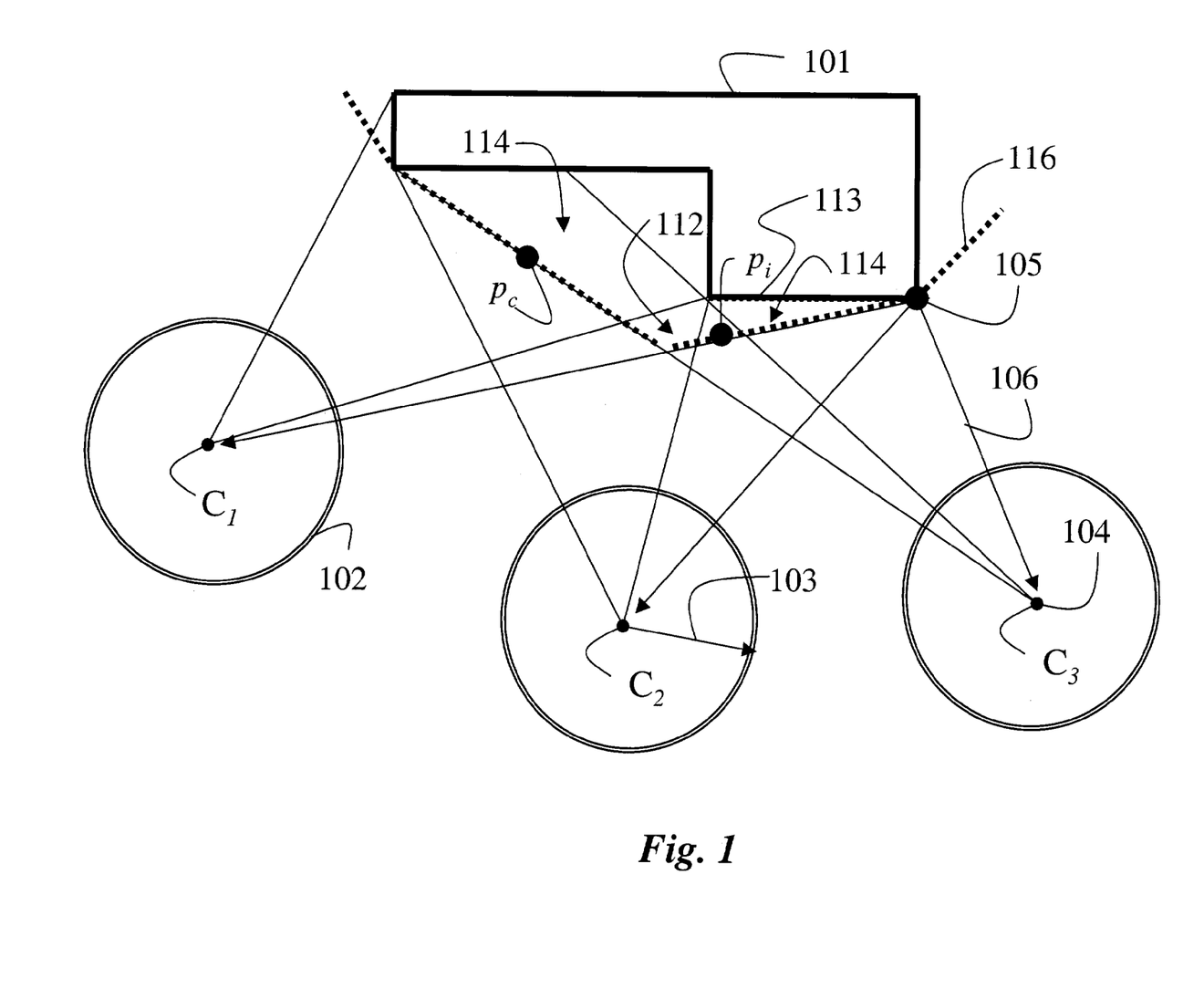
FIG. 1 is a two-dimensional schematic of analytical model used by the invention.

As shown in FIG. 1, the idea behind the invention is based on the following analysis. A set of n-images, e.g., three, is acquired from arbitrary viewpoints of a static scene 101 by calibrated cameras $C_1$, $C_2$, $C_3$. In this example, the object 101 has two colors, e.g., mostly red for the solid line portion, and green for the short dashed line 113 portion on the right front face of the object 101.

For the purpose of this analysis, each camera is omni-directional with a spherical image plane 102 at a unit distance 103 from a center of projection (COP) 104 of the camera. The dashed line 116 is the convex visual hull of the scene 101.

All rays entering the camera are parameterized in terms of spherical coordinates $(\rho, \theta)$. Below, we describe the more conventional pinhole camera model with a Cartesian parameterization.

A point 105 in the scene can be projected into any camera by intersecting the spherical image plane 102 with a directed line 106 from the point to the camera's COP 104. For any two points, we say that the point $P_1$ is visible from the point $P_2$ if an open segment $P_1P_2$ does not touch any object in the scene. An image is a projection of all visible points in the scene onto the spherical image plane 102.

A depth image stores depth values along the line of sight to each visible point. A depth discontinuity is an abrupt depth change in a depth image.

If the scene contains objects with diffuse color, then each point in an image contains the color of the closest visible object surface along the line-of-sight. Ignoring depth or color discontinuities for the time being, we call the set of all image points with the same color an image region. We call the color of an image region its region identification (ID) or label.

An image that contains region IDs for each point is called a labeled image.

Our problem is to reconstruct the scene from the set of n labeled images. Theoretically, there are an infinite number of such scenes, see Kutulakos et al., above. To obtain a unique solution, we restrict ourselves to finding the scene with a maximum volume that produces the set of labeled images. Some other criteria could be used. For example, one could try to find the smoothest scene that produces the set of labeled images.

Consistency and Cells

To continue our analysis, a ray is projected from a point p in the scene to a camera c. The ray intersects the labeled image of c at an image region with an associated region ID. The point is consistent with a set of visible cameras if the point projects onto the same region IDs in the set of cameras. If the point is not visible in a particular camera, the point is trivially consistent with that particular camera. The point is also trivially consistent if it is visible in only one camera.

In FIG. 1, the point $P_i$ is inconsistent because the region IDs of its projections are not the same, i.e. some are 'red' while others are 'green'. That is because the dashed portion 113 of the object has a different color than the rest of the object. The point $P_c$ is consistent because all region IDs are 'red'. In fact, all points in region 112 are inconsistent, and all points in region 114 are consistent.

We project rays from a 3D scene point p to all cameras and identifying all image regions where the rays intersect the image planes, without taking occlusions into account. We list the region IDs of the projections as a vector with one entry per camera. We call this vector the point ID. Each 3D point has exactly one point ID, but there may be many points with the same ID. We call the set of points with the same ID a cell. The point ID of points in a cell is called the cell ID.

A cell is called consistent with a set of cameras if and only if all points of the cell are consistent with the entire set of cameras. Because only visible points can be consistent, we can restrict the consistency checks to the boundaries of cells.

FIG. 1 shows examples of inconsistent 112 and consistent 114 cells inside the convex hull 116 of the object 101. Our definition of consistency is an extension of photo-consistency as described by Kutulakos et al, see above. Because we assume omni-directional cameras for now, background regions are not considered.

Kutulakos et al. call the maximum volume that is photo-consistent the photo hull. If the labeled images are produced by projecting a scene as described above, then our reconstruction problem is equivalent to finding the photo hull.

Kutulakos and Seitz prove that all points inside the photo hull are consistent, and that all points outside the photo hull are inconsistent.

Cell Reconstruction Theorem

For a set of n labeled images, the scene with maximum volume V that produces the labeled images is composed only of consistent cells C. All cells outside of the maximum volume V are inconsistent. A proof for this theorem is provided in Appendix A.

Necessary Conditions for Consistency

The above theorem states that removal of all inconsistent cells will yield the maximum volume V that produces the labeled images. The next important question is to determine the number of cameras that are necessary to determine the consistency of a cell.

The space carving method described by algorithm in Kutulakos et al. uses multiple passes of a single sweeping plane and evaluates the projection of points into cameras on one side of the plane. That means for certain camera arrangements, photo-consistency of a point is checked with as few as two cameras.

Figure 2:
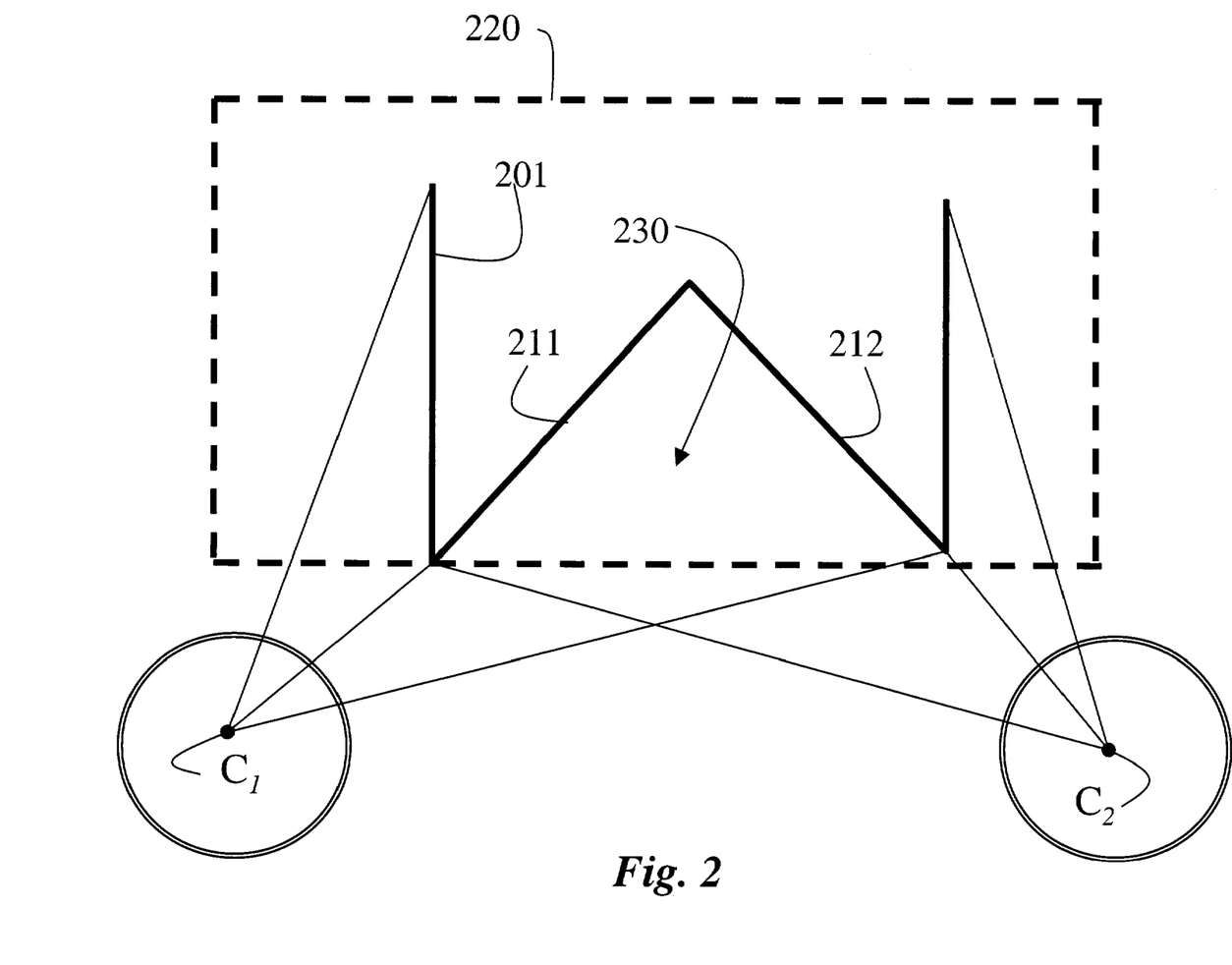
FIG. 2 is a schematic of a scene with a concave region.

However, as shown in FIG. 2, checking consistency with two cameras is not sufficient to find the photo hull for a scene 201 with a V-shaped concave region in 2D. The sides of the concavity have two distinct uniform colors, e.g., red 211 and yellow 212. The two cameras $C_1$ and $C_2$ are positioned such that each camera sees the projection of exactly one of the two colors.

The dashed line 220 outlines the initial volume for the scene. Using just cameras, $C_1$ and $C_2$, the triangular interior cell 230 would be removed by Kutulakos et al. because of photo-inconsistency. However, this is incorrect, because the maximum volume that is photo-consistent with the images may include large parts of cell 230.

Figure 3:
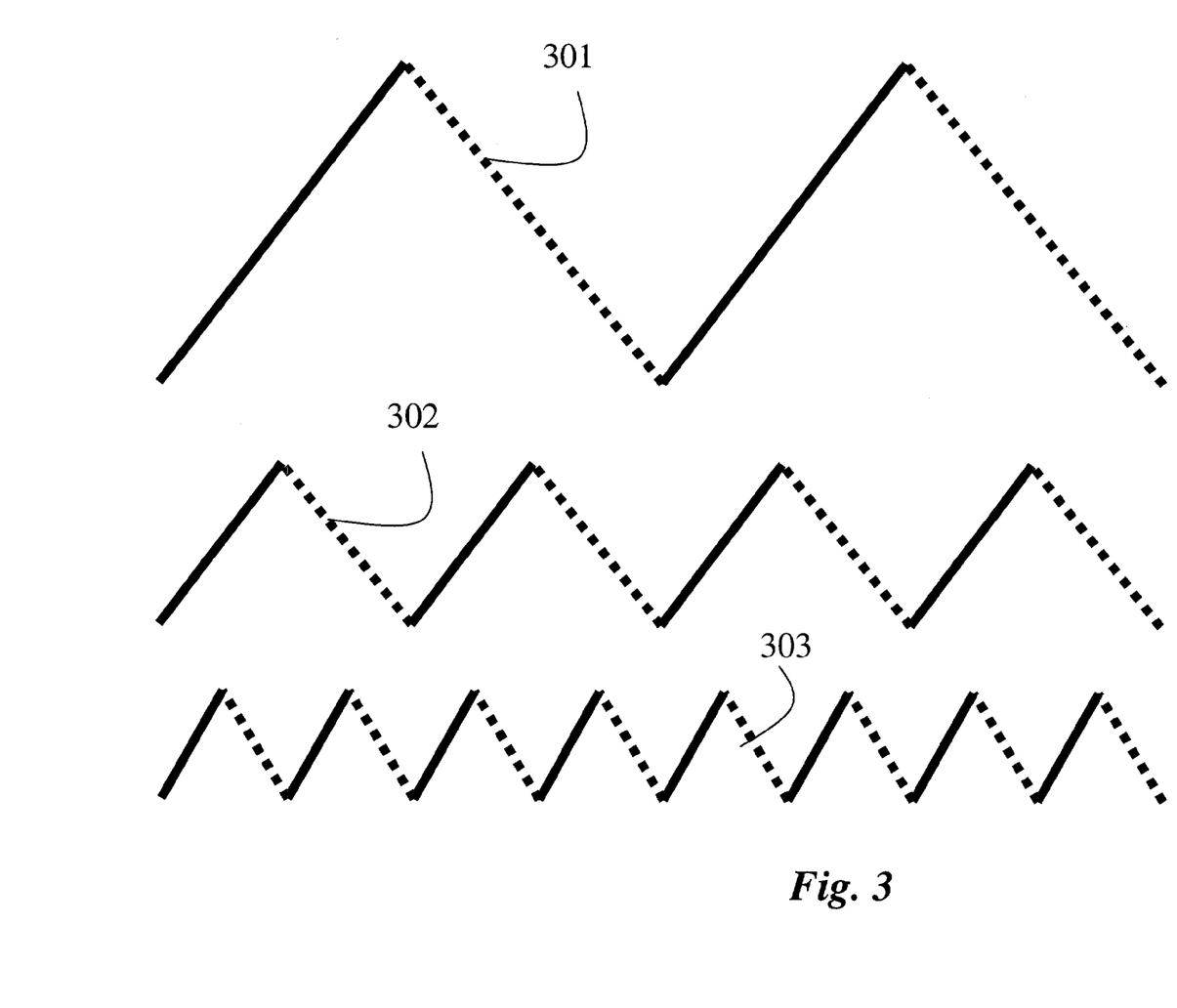
FIG. 3 is a schematic of scenes with multiple concave regions.

As shown in FIG. 3, the V-shaped concavity can be replaced by infinitely many shapes 301–303 that are also not photo-consistent with the two cameras. In the limit, these shapes converge to a plane of micro-facets that project a different color into each camera. We call these shapes photometrically ambiguous. These are handled incorrectly in the prior art.

It can easily be shown that at least three visible cameras are required to determine the consistency of a cell in 2D. The equivalent example in 3D consists of stacked cubes with different colors on each visible side viewed orthographically from the direction of the face normals. This means at least four cameras are required to determine consistency in 3D. In general, at least d+1 visible cameras, i.e., images from different viewpoints, are required to determine the consistency of a cell in d dimensions. The requirement of having four visible cameras to determine consistency in 3D may be hard to meet in practice, especially with a small number of input images.

It should be noted that for a static scene a single camera could serially acquire the set of necessary images from the required number of different viewpoints. Thus, when we talk about the camera requirements, we mean the number of different viewpoints from which the images are acquired.

However, our system enables the user to resolve photometrically ambiguous situations with image segmentation 730, see FIG. 7. If the user also identifies all interior edges with depth discontinuities, then only two cameras (viewpoints) are required for correct consistency checks. That is, when the images are segmented 730 along depth discontinuities in the scene, a correct determination of consistency can be made with fewer than four camera viewpoints.

Reconstruction by Cell Carving

Figure 4:
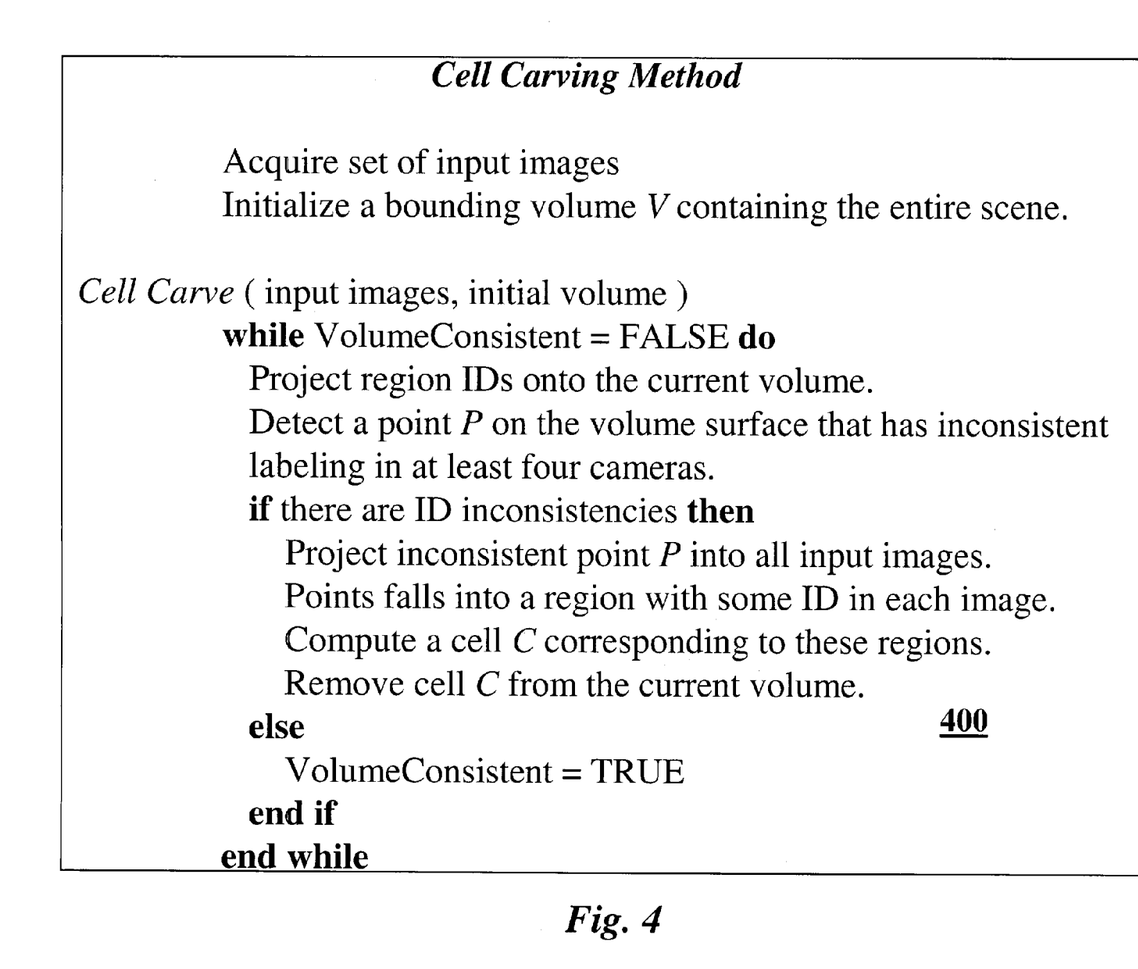
FIG. 4 is pseudo code for a cell carving method according to the invention.

FIG. 4 shows the pseudo code of steps of a cell carving method 400 for 3D scene reconstruction according to our invention.

Given an initial set of cells $V_i$ that form a bounding volume that contain the entire scene, the method iteratively removes cells $C_i$ from $V_i$ that are inconsistent in at least four cameras. The remaining cells are the maximum volume that produces the labeled images, this is the 3D model of the scene.

A set of image regions is the set of all rectangular image pixels. If we use the scene radiance at each pixel as the pixel's region ID, cell carving reconstructs the photo hull. On the other hand, if the user assigns the same region ID to foreground and background objects, respectively, cell carving reconstructs the visual hull, instead of the photohull.

The quality of the scene reconstruction depends on how much effort the user puts in while segmenting and identifying the image regions. Many small regions will result in a more detailed 3D model than a few, large regions. This is also a generalization of voxel carving, in that the fidelity of the scene is not determined by some pre-determined voxel grid, but by the actual geometry observed in the images. The number of image regions determines the number of cells that make up the maximum volume. Assume we have n images and m regions in each image, then there are at most mn cells.

However, the vast majority of these cells are empty. There are configurations where there can be $m^3$ consistent cells, e.g., when the images correspond to three sides of an orthographic cube. In a practical application, the number of consistent cells m is typically small, usually less than twenty regions per image. To further reduce processing time and memory, we construct cells only when needed, as described below.

Additional Constraints

So far, we have described the theoretical foundation of our scene reconstruction method. We now describe some additional constraints that make the method practical for implementation. First, we restrict the omni-directional camera assumption to a perspective pinhole camera. Projections of lines in three dimensions are now lines in the image plane. Conversely, regions defined by polygons lead to polyhedral cells in 3D. This allows us to use a fast method for constructing polyhedra, as described below, which only uses 2D polygon intersections.

To uniquely identify cells, all points in the scene need to project to a region in all cameras. However, pinhole cameras have a limited viewing frustum. We simulate an omni-directional camera by assuming that the image plane is infinite. Points outside the viewing frustum project to a region on either side of the image plane with a unique unknown ID. Other image regions that should not be reconstructed, e.g., a background sky, do not have to be labeled by the user. Unlabeled regions are assigned a unique background ID.

As described by Kutulakos et al., the maximum consistent volume may not be finite. It may be the volume that fills all free space and reproduces the labeled images. We restrict the scene with an initial bounding volume that is guaranteed to contain the entire reconstructed scene. The selection of the initial volume depends on the scene and camera arrangement. If all cameras see the objects in the scene, then we compute the visual hull and use it as the initial volume. Otherwise, we let the user specify an initial volume as described below.

User Input

For scenes where the calibration is unknown, we use conventional computer vision methods to estimate the intrinsic and extrinsic parameters of the camera. The user selects about twenty feature points in each image and assigns correspondences to the features points, for example, feature points can be on edges or corners of objects. The correspondences can then be used to determines the position and orientation of all cameras.

If the visual hull of the scene cannot be determined because of the camera arrangement, then the user can initialize 720 the bounding volume. To simplify the task, we can display orthographic views of the cameras and the 3D feature points on a display device during calibration. The user then specifies corners of the bounding volume V 702 of the scene.

The user segments 730 each image into a set of arbitrary 2D image regions using any of the segmentation tools that are commonly available in photo-editing software, such as brushes, snakes, intelligent scissors, region growing, flood fills, watershed algorithms, or intelligent paint. As described above, better results can be obtained if the segmentation is along depth discontinuities in the scene.

The boundary of a region is defined by a polygon (possibly with holes) that consists of an outer boundary and zero or more inner boundaries. The intersection of adjacent polygons are a set of common edges to both. The user also assigns 740 a label L to each polygon region corresponding to the different objects in the scene.

Color Discontinuities

Figure 5:
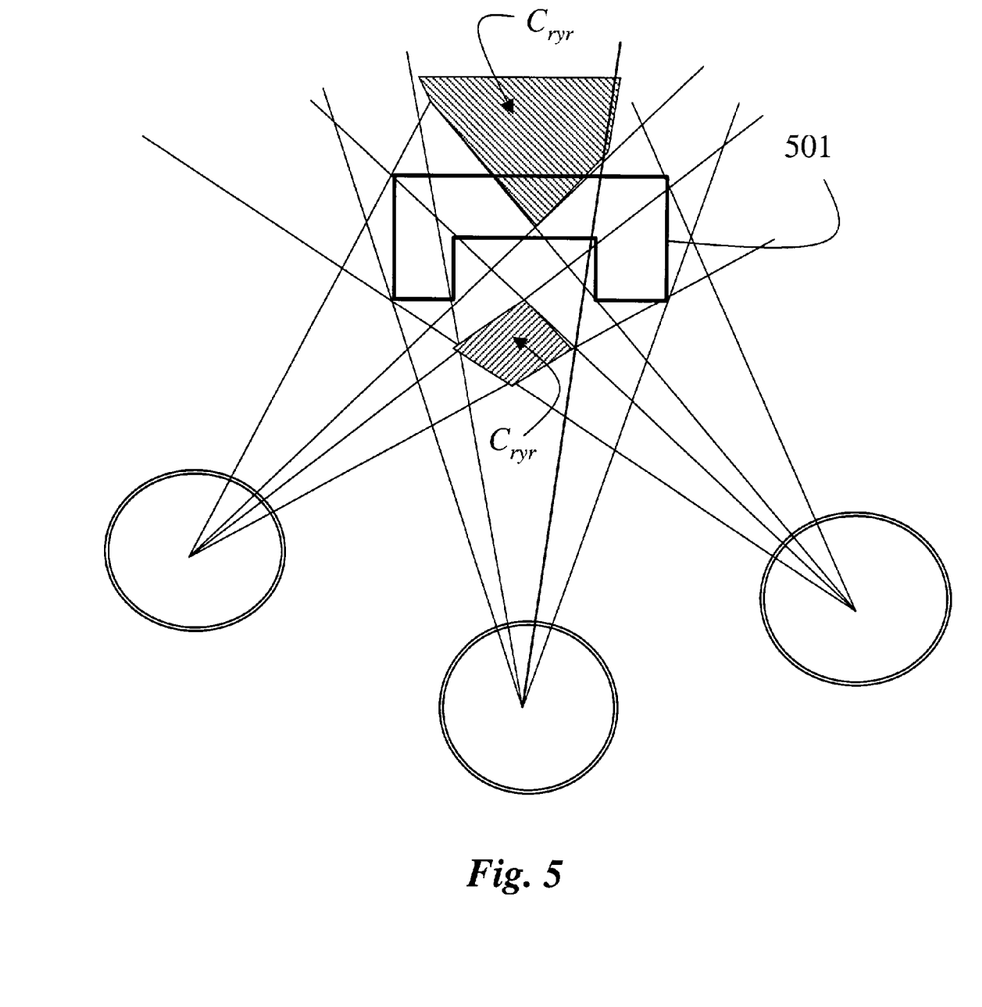
FIG. 5 is a schematic of a scene with a color discontinuity.

Only labeling on the basis of color segmentation is not adequate for all cases. There are cases where non-adjacent regions with the same label will cause excessive carving, as shown in FIG. 5 for an object 501. The object projects to red regions (solid line) in the three cameras that are disconnected by a yellow region (dashed line in central front section). We call this a color discontinuity. The two shaded cells $C_{ryr}$ have the same cell ID: e.g., red-yellow-red.

Because the front-most, i.e., bottom in FIG. 5, of these two cells is inconsistent with the three cameras, it will be removed. But that means the back cell will also be removed because it has the same cell ID.

However, the back cell is trivially consistent because it is not visible and should be preserved. Fortunately, there is an easy remedy to this situation. We automatically assign a unique index I to each disconnected image region. Therefore, a pair <L, I> 704 is used as the region ID, where L is the user-assigned label, and I is the index. With this approach, the two cells $C_{ryr}$ have different cell IDs, and only the front cell will be removed.

Cell Carving Implementation

We now describe an efficient implementation of cell carving that makes use of graphics hardware and fast 2D polygon intersections. Instead of constructing a complete volume of cells, we use a lazy evaluation and only generate cells as needed. The reason is that we are only interested in the boundary representation of the reconstruction.

Figure 6:
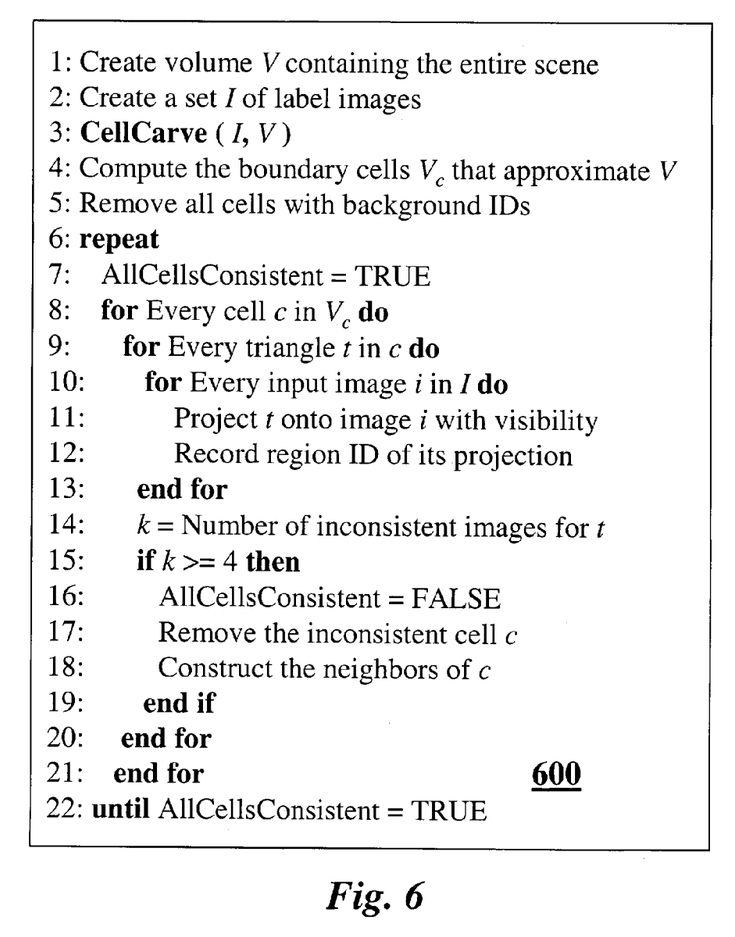
FIG. 6 is pseudo code for an alternative embodiment of the cell carving method according to the invention.

FIG. 6 shows pseudo-code 600 for this embodiment of our method.

Line 1 and 2—Pre-Processing

As described above, we start with an initial bounding volume 702 that contains the entire scene. The user also provides a set of labeled polygons, e.g., triangles, with corresponding region IDs for each image. To quickly check the region ID to which a point projects, we scan-convert and flood-fill the polygons with a color corresponding to their region ID.

Line 4—Construction of the Initial Boundary Cells

We either use the visual hull as the boundary representation of the initial volume, or a user specified bounding box. Because our method works only on cells, we replace this bounding box with a set of cells that encompass the bounding box. This way we avoid arbitrary and difficult CSG operations between cells and the boundary representation.

To construct the initial boundary cells, we pick arbitrary points on the surface of the bounding box that are visible in some of the cameras. We then replace these points with their corresponding cells. To construct a cell, we use a procedure that computes the intersection of solids with fixed cross-sections. This reduces the computation to a set of polygon intersections that can be carried out efficiently in 2D.

We repeat the construction of cells until no more bounding box is visible.

To check visibility, we use graphics hardware and render each mesh independently with a different color.

If a polygon of the bounding box are still visible, then we generate the corresponding cells until the whole bounding box is covered.

Line 5—Removing All Cells with Background IDs

To speed up the cell carving, we first remove all cells that project to a region with the background ID. We check all boundary cells to see if they contain the background ID. To remove a cell, we delete it from the list of boundary cells and add it to the list of removed cells. To fill holes when removing a boundary cell, we generate its neighboring cells if they are not in the lists of boundary cells or removed cells.

To generate the neighbors of a cell, an adjacency graph that stores the cell IDs of neighbors for all currently generated cells can be used. Because there are typically a small number of cells, we use a less efficient search method to find adjacent cells. Cells outside the initial bounding volume are not generated. Instead, outside cells are added to the list of removed cells. A cell not in the list of boundary cells or removed cells is generated as described above.

Lines 8 to 21—Detecting Inconsistent Cells

The main loop of the method detects and removes inconsistent cells. First, we determine the images for which a cell is inconsistent. For each cell, we keep a list of triangles. For each triangle, we record the region ID in which the triangle is visible. This is done by projecting the triangle and recording the region ID of its projection. By construction, projections of cell triangles never cross the boundary of image regions. Then, we check in how many images the triangle has mismatched region IDs. If the triangle is inconsistent with at least k images, e.g., k=4 in 3D, we mark the corresponding cell as inconsistent. Then, we remove inconsistent cells and insert the neighboring cells as described above. We repeat this loop until there are no more inconsistent cells.

To reduce the amount of user input as much as possible, automatic computation of the initial volume can be accomplished using information about camera pose and region correspondences. The user input can be replaced by an unsupervised segmentation procedure, and automatic assignment of region correspondences.

An analytical visibility solution could be used for a more precise reconstruction. However, recent advances in graphics hardware, including floating point frame buffers and arithmetic, make this unnecessary. To get a smoother reconstruction, other contour representations, such as splines, can be used instead of triangles.

The reconstruction can be improved with other techniques, for example, multi-view stereo. If per-pixel depths are estimates, then a mesh of the scene can be produced with a displacement map per polygon.

Additional geometric constraints can be provided. For example, the user can assign a planar constraint to certain image regions, such as walls and ground planes, to improve the reconstruction. Plenoptic image editing can propagates edits in one image to all other images using the reconstructed 3D model.

Effect of the Invention

The invention provides a method for reconstructing an arbitrary 3D scene from a set of input images. Instead of relying on computer vision techniques for segmentation and object recognition, our approach divides the tasks equitably between a user and computer. The user can easily recognize, segment and label corresponding objects in a set of images, whereas computers are better suited for automatically constructing the 3D model consistent with the user's labeling.

The invention provides a novel formulation of the 3D reconstruction problem for labeled image regions. We describe necessary conditions for label consistency, and we prove the correctness of using cells for reconstruction. Our cell carving method can be efficiently implemented and produces polygon meshes that can be immediately texture-mapped and displayed using conventional rendering techniques.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention

We claim:

1. A method for constructing a three-dimensional model of a scene from a set of calibrated images, comprising:
   acquiring a set of images of a scene;
   initializing a bounding volume for the scene;
   segmenting each image into a plurality of regions;
   labeling each region with a label to determine correspondences of the regions;
   projecting points in the images onto the bounding volume to detect inconsistent points;
   projecting the inconsistent points onto all of the images to identify inconsistent regions;
   determining inconsistent cells in the inconsistent regions;
   removing the inconsistent cells from the volume until a maximum volume consistent with the scene remains as a model of the scene.

2. The method of claim 1 further comprising:
   rendering the three-dimensional model on an output device for an arbitrary viewpoint.

3. The method of claim 1 wherein the three-dimensional model is a polygon mesh.

4. The method of claim 1 wherein the scene includes substantial occlusion among multiple objects, large variations in geometric scale and detail, and a mix of textured, uniformly colored, specular, and transparent surfaces.

5. The method of claim 1 wherein a number of images used to detect the inconsistent points and the inconsistent cells is one greater than a dimensionality of the scene and the model.

6. The method of claim 1 further comprising:
   segmenting the images into regions along depth discontinuities.

7. The method of claim 1 wherein the region label is derived from radiance emitted by the scene into the images.

8. The method of claim 1 wherein the cells are polyhedral.

9. The method of claim 1 wherein unlabeled regions are assigned a unique background label.

10. The method of claim 1 wherein the initial bounding volume is a visual hull.

11. The method of claim 1 wherein the initial bounding volume is a user specified bounding box.

12. The method of claim 1 wherein the set of images are calibrated.

13. The method of claim 1 wherein the segmenting is performed by a user with photo-editing software.

14. The method of claim 1 wherein the labeling is performed by a user.

15. The method of claim 1 wherein each label is a pair <L, I>, where L is user assigned label, and I is an index.

16. The method of claim 1 wherein each region is a set of labeled polygons.

17. The method of claim 1 wherein the segmenting is performed automatically.

18. The method of claim 1 wherein the regions are constructed of splines.

19. The method of claim 1 wherein the regions are constructed of triangles.

20. The method of claim 1 wherein the set of images are acquired from arbitrary different viewpoints with arbitrary viewing direction.

* * * * *